March 20, 1945.  E. S. BRISTOL  2,371,732

ELECTRICAL CONTROL SYSTEM

Filed Aug. 27, 1942

INVENTOR.
Edward S. Bristol
BY
ATTORNEY.

Patented Mar. 20, 1945

2,371,732

UNITED STATES PATENT OFFICE 2,371,732

ELECTRICAL CONTROL SYSTEM

Edward S. Bristol, Philadelphia, Pa., assignor to Leeds and Northrup Company, Philadelphia, Pa., a corporation of Pennsylvania Application August 27, 1942, Serial No. 456,428

6 Claims. (Cl. 172—239)

My invention relates to electrical control systems of the type in which relative displacement of two members, one responsive to changes in magnitude of a condition, such as pressure, temperature, or other physical, chemical, or electrical condition, is utilized to effect adjustment of the other of said members to control the magnitude of said condition.

In accordance with my invention, aforesaid responsive member, such as the pointer of a Bourdon tube, galvanometer or the like, normally free to respond to changes in magnitude of the controlled condition, is intermittently engaged by a slidewire, or equivalent impedance, of a balanceable network to include in the network a relay, or equivalent, which upon unbalance of the network effects rebalancing adjustment of a second impedance concurrently with adjustment of a valve, rheostat or other control member; more particularly, the responsive member, if away from its neutral position, corresponding with a selected fixed magnitude of such condition, when engaged by the slidewire, is displaced thereby to effect operation of a reversing switch controlling relatively slow adjustment of other impedances in the balanceable network to preclude stable balance thereof except with said responsive member at neutral position.

My invention further resides in systems and apparatus having the features hereinafter described and claimed.

Figure 1:
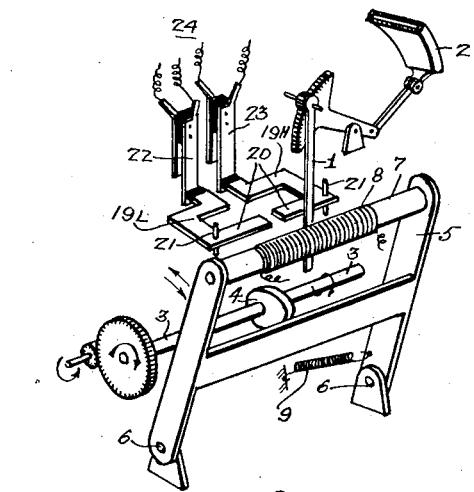
Figure 2:
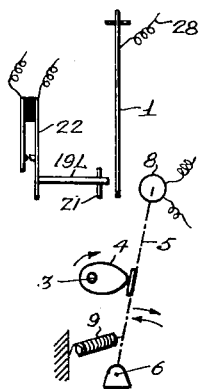
Figure 3:
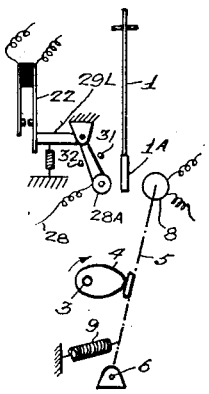
Figure 4:
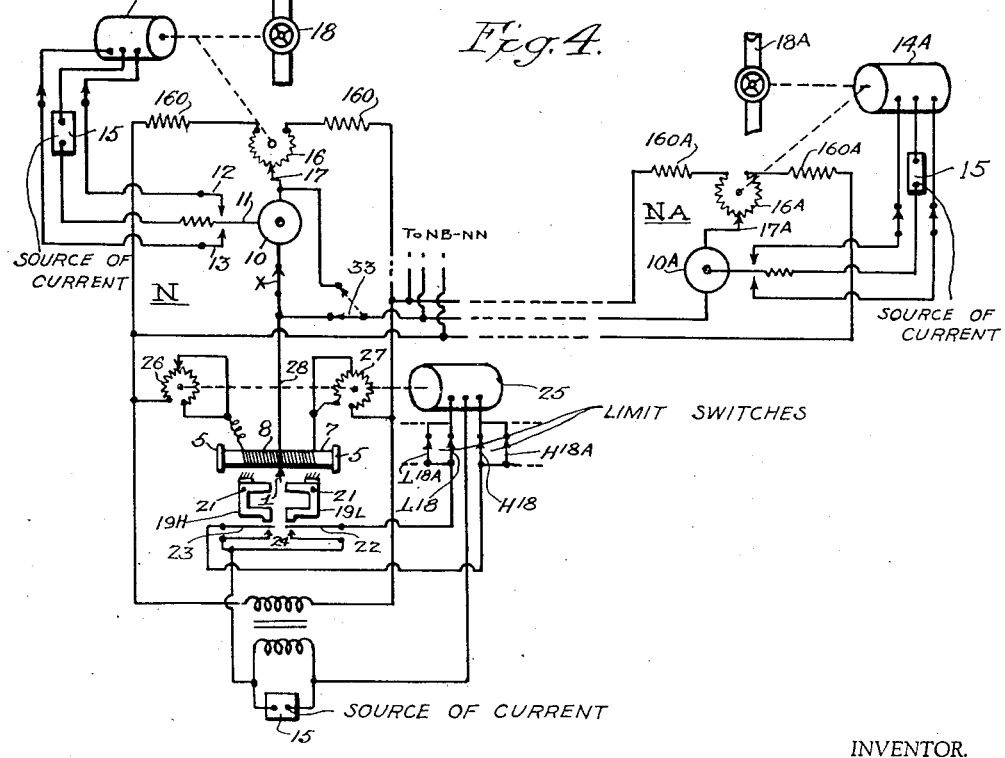

For an understanding of my invention, reference is made to the accompanying drawing in which:

Fig. 1, in perspective, shows significant elements of the control apparatus;

Fig. 2, shows elements of Fig. 1 in side elevation;

Fig. 3, similar to Fig. 2, shows modification of some of the elements thereof;

Fig. 4, schematically illustrates a control system including the apparatus of Fig. 1.

Referring to Figs. 1, 2 and 4, the pointer 1, which serves as or carries an electrical contact, is adjusted by a Bourdon tube 2, generically illustrative of a device responsive to changes in magnitude of a condition to be controlled, so that its position substantially continuously corresponds with the existing magnitude of the condition which for brevity in further explanation, may be assumed to be the pressure of steam in a header or supply line.

Upon the shaft 3, rotated at suitable rate, for example fifteen revolutions per minute, by a motor, is mounted the cam 4 which controls rocking movement of frame 5 about its pivots 6 toward and from the position shown in Fig. 2. Frame 5 carries form 7 upon which is wound the slidewire 8 of a Wheatstone bridge N, Fig. 4, including a second slidewire 16 and end resistances 160. One of the conjugate arms of the bridge includes the relay 10, or equivalent device, responsive to unbalance of the bridge and capable of distinguishing between the two possible senses of unbalance.

Once for each revolution of shaft 3, the frame 5 is permitted by cam 4 to be moved by its biasing spring 9 to effect engagement of contact or pointer 1 with the slidewire 8 and so complete that arm of the bridge network which includes the differential relay 10, or equivalent. For a substantial fraction of each revolution of shaft 3, the pointer is free to respond to any change in the condition under measurement, for example, pressure, without restraint by engagement with slidewire 8.

If when pointer 1 is engaged by slidewire 8, the network N is in balance there is no deflection of the movable contact member 11 of relay 10; if however, the network is unbalanced when pointer 1 engages slidewire 8, the movable contact member 11 of relay 10 deflects in direction corresponding with the sense of the unbalance of the network to engage one or the other of contacts 12, 13 which together with contact 11 constitute a reversing switch for motor 14 which may be of any suitable type, for example the split field type.

The armature of motor 14 is suitably mechanically coupled to effect relative adjustment of slidewire 16 and contact 17 in engagement therewith and the motor windings or connections are so poled that the adjustment of slidewire 16 for either sense of deflection of relay contact 11 is in proper sense to effect rebalance of network N. The rotor of motor 14 may be also suitably mechanically connected to the valve 18, generically illustrative of a control member whose position affects the magnitude of a condition to which pointer 1 is responsive. For example in a combustion control system, the member 18 may control the rate of supply of air or fuel to the furnace of a steam generator; as exemplary of systems in which the rate of supply of air or fuel is determined by the setting of a rheostat or valve, reference is made to my Letters Patent Nos. 1,851,974; 1,854,922; 1,870,984.

For large sudden changes in position of pointer 1, the portion of the immediately subsequent cycle for which motor 14 is energized may be too short to afford sufficient time for complete restoration of balance of the network and several cycles may elapse before that result is attained. However, the power and speed of motor 14 should be sufficiently great to insure close correspondence of the positions of contact 1 and 17 with respect to their associated slidewires even for rapid changes of the controlled condition.

As thus far described, for each different magnitude of the controlled condition with the control range, there is a corresponding position of pointer 1 and of contact 17, and in dependence upon the load, the network N eventually comes to balance with pointer 1 displaced from the position corresponding with the mean magnitude of the controlled pressure or other condition. This may be objectionable in systems subject to wide variations in load.

To prevent the network N from remaining in balance for any position of contact 1 except that position thereof corresponding with the mean pressure or temperature, there are provided the two switch operating members 19H, 19L, the arms 20, 20 of which are spaced from each other by a distance slightly exceeding the width of the pointer 1 so that when the pointer is in its neutral position corresponding with the mean temperature or pressure it may enter the gap between the ends of arms 20, 20 when deflected by engagement with the slidewire 8.

If however, when bent back out of its normal plane of movement by the slidewire 8, the pointer 1 is displaced from its neutral position it engages one or the other of the members 19H, 19L depending whether the pressure or temperature is above or below normal, and causes it to swing about its pivot 21 and so effect circuit closing movement of one or the other of contacts 22, 23 of reversing switch 24. The fixed pivots 21 of members 19H, 19L are so located and cam 4 is so shaped that the portion of the cycle for which the reversing switch is closed is at least roughly proportional to the extent of displacement of pointer 1 from its neutral position.

The closure of reversing switch 24 effects rotation in one direction or the other of reversible motor 25 whose armature is mechanically coupled through suitable reduction gearing to the moveable elements of the droop-correction slidewires 26, 27 oppositely adjusted in unison by motor 25 in sense tending slowly to unbalance network N effectively in opposition to the relatively rapid rebalancing adjustment of slidewire 16 by motor 14.

In consequence upon occurrence of a sudden change in position of pointer 1 with respect to slidewire 8, there is substantially immediately effected, in the next cycle or so of the control apparatus, a large adjustment of valve 18 and of slidewire 16 in sense proper to rebalance network N at the new position of pointer 1; in all subsequent cycles, until the control action causes pointer 1 to return to its neutral position, the slidewires 26 and 27 are slowly adjusted by motor 25 in sense simulating further slight changes in the same direction as the original departure from normal of the controlled condition. Consequently after the first large corrective adjustment of valve 18, or equivalent control member, it is subjected to additional smaller adjustments in one sense or the other until finally the pressure or temperature is returned to its original desired magnitude. The position of the valve will however in general be different than before in dependence upon factors of operation of the system including the load upon it.

To utilize the apparatus of Fig. 1 as a master controller for two or more valves, rheostats, or the like, for controlling for example the supply of air and fuel to a furnace, or air and/or fuel to different furnaces there is provided, as shown or suggested in Fig. 4, for each of the additional control members, its individual controlling motor (14A) coupled thereto and to the corresponding slidewire (16A). Motor 14A, for example, is controlled by relay 10A, or equivalent, individual to a network NA which, for the full line position of switch 33 and closed position of switch X, includes slidewire 16A, individual to network NA and also the slidewires 26, 27 and 8 common to all of the networks; similarly, each of the additional networks NB—NN includes the slidewire 8 in two of its arms. The networks N—NN and the motors may be energized from one or more sources of current, alternating or direct, or as shown, from a single source of alternating current 15.

All of the networks N—NN are unbalanced by change in position of pointer 1 and each is rebalanceable by adjustment of its individual slidewire 16—16N. Thus in a battery of steam generators supplying a common header, all units at once respond to the master controller in maintenance of a desired header pressure by control of the rate of supply of fuel and/or air to the individual furnaces of the generators.

With each of valves 18—18N, or equivalent, is associated a pair of limit switches (H18, L18) to interrupt a circuit of motor 25 when the valve has been moved to either limit of its range of adjustment. For example if the "open" limit switches are in parallel when all of limit switches H18—H18N are opened because of arrival of all of valves 18—18N to fully open position, motor 25 cannot be energized to effect adjustment of resistances 26, 27 in that sense requiring further opening of the valves; however because limit switches L18—L18N are closed, motor 25 can be energized for adjustment of resistances 26, 27 in the opposite direction. Similarly when all of valves 18—18N have been moved to minimum open, or fully closed, position, the corresponding "close" limit switches (L18—L18N) are opened to prevent energization of motor 25 in that sense for which resistances 26, 27 are adjusted to simulate further rise in pressure; motor 25 can however be energized in reverse direction when the pressure has fallen sufficiently to cause engagement of pointer 1 with member 19L of the reversing switch 24.

If the limit switches H18—H18N are in series, instead of in parallel, with each other opening of any of them prevents energization of motor 25 in that sense effecting adjustment of resistances 26, 27 in direction demanding further opening of the valves 18. Similarly if limit switches L18—L18N are in series with each other, instead of in parallel, arrival of the movable element of any of valves 18—18N to minimum open, or fully closed, position prevents further energization of motor 25 in sense, but only in that sense, simulating further rise in pressure.

By throwing switch 33 from full-line to dotted line position, each of relays 10A—10N responds to any difference between the position of its associated controlled member 18A—18N and the position of the controlled member 18. With this modification, the members 18A—18N are not directly controlled by pointer 1 but by slidewire 16. Among other advantages, this modification is well suited for intervention of manual control because manual resetting of the master control member 18 is all that is necessary to effect adjustment of all of the controlled members 18A—18N to their corresponding positions.

In that form of the control apparatus shown in Fig. 2, the pointer 1 itself serves as the slidewire contact but it is desirable to avoid passage of current through the bearings of a relatively delicate instrument. Therefore, as shown in Fig. 3, the pointer 1 may be of insulation carrying at its end a light contact member 1A which serves to complete the galvanometer arm of bridge N when engaged by slidewire 8 and forced by it into engagement with one or the other of a pair of contact bars 28A each connected to lead 28. The contact bars 28A are supported respectively by pivoted members 29L, 29H (only one of which is shown), which may also correspond in function with the members 19L, 19H of Fig. 1, when it is desired to incorporate droop-correction. Preferably the members 29L, 29H are each biased as by a spring 30 into engagement with a stop 31 which positions the bars 28A very close to but out of contact with the pointer 1. The extent to which the pointer 1 may be bent by slidewire 8 may if desired be limited by stop 32 or by the shape of cam 4.

The contacting surfaces of slidewire 8 (Figs. 2, 3), contact 1 (or 1A) and contact bar 28A (Fig. 3) are maintained clean by their wiping or rolling engagement in each cycle of the control apparatus so ensuring reliable operation even though the apparatus is exposed to dusty atmospheres.

What I claim is:

1. A control system including a balanceable network comprising impedances, electro-responsive means, a movable member positioned in accordance with the magnitude of a condition, reversing members disposed on opposite sides of the desired neutral position of said movable member, means intermittently to effect engagement of said movable member with one of said impedances to effect response of said responsive means to unbalance of said network and, when displaced from neutral position, to effect actuation of one or the other of said reversing members, means controlled by said responsive means to effect rapid rebalancing adjustment of said network, and means controlled by said reversing members to effect a slower, unbalancing adjustment of said network.

2. A control system including a balanceable network comprising impedances, electro-responsive means, a movable member positioned in accordance with the magnitude of a condition, reversing members disposed on opposite sides of the desired neutral position of said movable member, means intermittently to effect engagement of said movable member with one of said impedances to effect response of said responsive means to unbalance of said network and, when displaced from neutral position, to effect actuation of one or the other of said reversing members, a controlled member having a range of adjustment, means controlled by said responsive means for effecting rapid rebalancing adjustment of said network and concurrent adjustment of said controlled member, and means controlled by said reversing members to effect slow unbalancing adjustment of said network which continues so long as said movable member is displaced from its aforesaid neutral position and the position of said controlled member is intermediate the limits of aforesaid range.

3. A system for regulating the magnitude of a condition comprising a balanceable network, electro-responsive means, a movable member positioned in accordance with the magnitude of said condition, reversing members disposed on opposite sides of the desired neutral position of said movable member, means intermittently to effect engagement of said movable member with an impedance of said network to provide for response of said responsive means to unbalance of said network and, when displaced from neutral position, selectively to effect actuation of one of said reversing members, means controlled by said responsive means to effect rapid rebalancing adjustment of said network, and means controlled by said reversing members to effect slower, unbalancing adjustment of said network.

4. A system for regulating the magnitude of a condition comprising a plurality of independently balanceable networks having an impedance in common, a plurality of electro-responsive means individual to said networks, a plurality of regulating members individually adjustable to affect the magnitude of said condition, a movable contact member positioned in accordance with the magnitude of said condition, reversing members disposed on opposite sides of the desired neutral position of said contact member, means intermittently to effect engagement of said contact with said common impedance to provide for response of each of said responsive means to unbalance of its associated network, a plurality of means each controlled by one of said responsive means to effect rebalancing adjustment of the network associated therewith and concurrent adjustment of one of said regulating members, and means controlled by said reversing members to effect slower, unbalancing adjustment of all of said networks.

5. Control apparatus comprising an electrical contact member deflecting in response to change in magnitude of a condition, a slide-wire movable to engage said contact member, spaced switch-operating members, and means for moving said slidewire intermittently to engage said contact member and to effect engagement of said contact member with one of said switch-operating members in dependence upon sense of its deflection from position corresponding with a predetermined magnitude of said condition.

6. Control apparatus comprising an electrical contact member deflecting from a neutral position in response to change in magnitude of a condition, a slidewire movable to engage said contact member, spaced switch-operating members, and means including cam structure for moving said slidewire intermittently to effect engagement of said contact member therewith and also to effect intermittent engagement of said contact member with one or the other of said switch-operating members in dependence upon the sense of its deflection from neutral and for times substantially proportional to the magnitude of the deflection.

EDWARD S. BRISTOL.